United States Patent [19]

Stromotich

[11] 4,321,842
[45] Mar. 30, 1982

[54] COMPOUND EPICYCLIC COG BELT SPEED REDUCER

[76] Inventor: Frank L. Stromotich, 4625 N. Piccadilly Rd., West Vancouver, B.C. V7W 1E3, Canada

[21] Appl. No.: 121,987

[22] Filed: Feb. 15, 1980

Related U.S. Application Data

[63] Continuation-in-part of Ser. No. 937,817, Aug. 29, 1978, abandoned.

[30] Foreign Application Priority Data

Feb. 19, 1979 [CA] Canada .................................. 321714

[51] Int. Cl.³ .......................... F16H 1/28; F16H 9/26; F16H 11/08
[52] U.S. Cl. .................................. 74/762; 74/750 R; 74/781 R; 74/797; 404/122; 74/766
[58] Field of Search .................. 74/801, 802, 798, 797, 74/796, 793, 750 R, 219, 762, 763, 766, 767, 781; 404/122

[56] References Cited

U.S. PATENT DOCUMENTS

| | | | |
|---|---|---|---|
| 3,115,794 | 12/1963 | Morin | 74/797 |
| 3,156,136 | 11/1964 | Sogabe | 74/802 |
| 3,481,222 | 12/1969 | Baron | 74/750 R X |
| 3,842,685 | 10/1974 | Philpott | 74/750 R X |
| 3,919,895 | 11/1975 | Kerr | 74/801 X |
| 4,044,633 | 8/1977 | Lee | 74/750 R X |
| 4,183,266 | 1/1980 | Osumi | 74/801 |
| 4,186,626 | 2/1980 | Chamberlain | 74/801 |

FOREIGN PATENT DOCUMENTS

| | | | |
|---|---|---|---|
| 456655 | 5/1949 | Canada | 74/750 |
| 516920 | 9/1955 | Canada | 74/750 R |
| 824402 | 10/1969 | Canada | 74/156 |
| 854946 | 11/1970 | Canada | 74/240 |
| 922926 | 3/1973 | Canada | 74/155 |

*Primary Examiner*—Nile C. Byers, Jr.
*Attorney, Agent, or Firm*—Ward Brown; Robert W. Beach

[57] ABSTRACT

In a speed reducer, a reaction sun is fixed to a frame and an output sun is coaxial with the reaction sun. An idler carrier assembly, rotatable about the common axis of the two suns, carries a planet shaft supporting a reaction planet and an output planet for conjoint rotation and in radial alignment, respectively, with the reaction sun and the output sun. Rotation of the idler carrier assembly effects orbiting of the planet shaft and its planets about the common axis of the suns. Endless loop force-transmitting elements connect corresponding suns and planets. Rotary input power is applied to the planet shaft effecting conjoint rotation of the planets and orbiting of the planets about the suns' axis. The epicyclic motion of the output planet effects rotation of the output sun. In a preferred embodiment, an input shaft carries a separate input sun coaxial with the other suns; the planet shaft supports an input planet in addition to supporting the output and reaction planets; and the input sun and the input planet are connected by an additional endless loop force-transmitting element. The input shaft is driven by a high-speed electric motor at a speed of at least 3,000 rpm and the velocity ratio of the speed reducer is at least 1,000:1.

29 Claims, 14 Drawing Figures

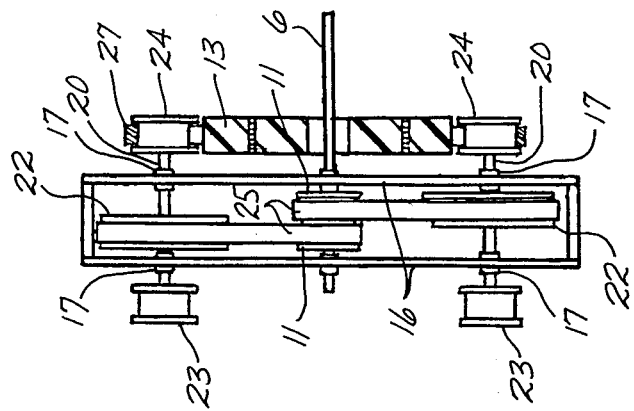
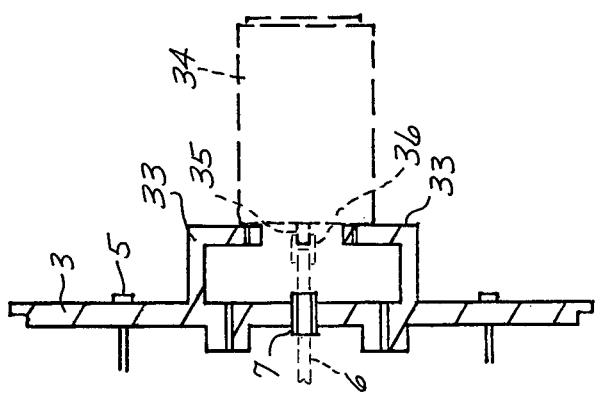
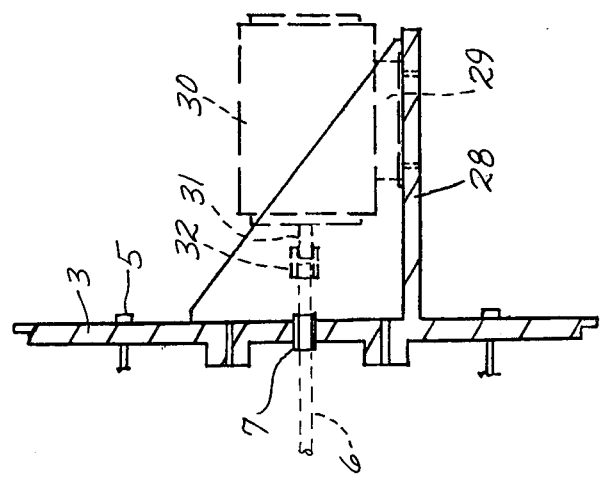

COMPOUND EPICYCLIC COG BELT SPEED REDUCER

CROSS REFERENCE

This application is a continuation-in-part of my copending U.S. patent application Ser. No. 987,817, filed Aug. 29, 1978, now abandoned, on Epicyclic Cog Belt Speed Reducer.

BACKGROUND OF THE INVENTION

1. Field of the Invention

The present invention relates to speed reducers and, more specifically, to a compound epicyclic speed reducer having a high velocity ratio, such as at least 1,000:1, and usable for an extended period at high input speed for the driving shaft, such as at least 3,000 revolutions per minute.

2. Prior Art

A speed reducer having a high velocity ratio between the driving and driven components of the reducer is required in applications where it is desired to increase the output torque of the driven component greatly over the input torque of the driving component, or where it is desired to decrease the output speed of the driven component greatly over the input speed of the driving component.

For achieving a high velocity ratio, "ordinary" gear trains, that is, trains using gears rotatable about axes stationary relative to each other, are undesirable because many sets of gears in series are required to achieve a high velocity ratio. While a higher velocity ratio can be achieved with fewer parts by use of worms, worms require precise machining and, in general, have a lower power transmission efficiency than spur gears.

Epicyclic gear trains offer the advantage of requiring fewer sets of gears to achieve a high velocity ratio, resulting in less weight without substantial reduction in power transmission efficiency as compared to ordinary gear trains. However, the gears of epicyclic speed reducers must be precisely machined and precisely positioned. In addition, there is more difficulty in adjusting the velocity ratio from any designed value for an epicyclic speed reducer than for an ordinary speed reducer because changing the size of any one gear in an epicyclic speed reducer usually requires repositioning at least some of the other gears.

Some of the problems with epicyclic speed reducers can be overcome by exotic design. For example, in the device of Baron U.S. Pat. No. 3,481,222 a "floating" orbiting planet shaft is provided so that the planet gears need not be positioned quite so precisely with respect to the sun gears as in an epicyclic speed reducer having a firmly positioned planet shaft.

A problem common to both ordinary and epicyclic speed reducers using meshing gears is that maximum input speed is limited. In producing electric motors of a given power rating, for example, the power to cost and power to weight ratios are substantially higher for a high-speed motor, such as a motor having an output speed in the range of 3,000 to 20,000 rpm, than for a low-speed motor, such as a motor having an output speed in the range of 1,000 to 3,000 rpm, so that an inexpensive high velocity ratio speed reducer capable of handling high input speed would be desirable. Conventional speed reducers using meshing gears simply cannot be driven above about 3,000 rpm for extended periods because of heat build-up resulting in rapid wear—at least without the additional expense of high precision machining and/or exotic and expensive gear materials and lubricants or lubrication systems. At high speed, lubricant is flung from the gears by centrifugal force. Heat buildup and rapid wear at high speed is even more of a problem with worms. A practical upper limit for the input speed of worm gear reducers is about 2,000 rpm.

Lubrication problems also can be overcome somewhat by exotic design. For example, the "Hart reduction pulley", which has a meshing gear epicyclic reducer, uses "splash lubrication" in which lubricant flung from spinning gears contacts the inner periphery of the specially designed reducer housing and splashes back onto the rotating gears. Nevertheless, even the Hart reduction pulley is recommended for use with a motor having an output speed of only 1,750 rpm.

Naturally, total cost is a primary consideration in the selection of an electric motor-speed reducer combination producing a desired output speed and torque. In general, where low output speed is required, the cost of the speed reducer portion is much greater than the cost of the electric motor portion. Up to now, to achieve a desired low output speed, the combination of a high-speed motor and a high velocity ratio speed reducer capable of handling high input speed has not been cost effective, because the additional expense of the high input speed, high velocity ratio speed reducer is substantially greater than the cost savings resulting from using a high-speed motor. Again, it is apparent that an inexpensive high velocity ratio speed reducer capable of handling high input speed is desirable.

For a specific application, ordinary and epicyclic gear trains can be used in combination. For example, the device of Zucchellini Canadian Pat. No. 824,402 uses an epicyclic reducer driving a worm to achieve exact positioning of a slide that can carry machine tools. The devices of Lemmens Canadian Pat. No. 922,926 and Roper Canadian Pat. No. 935,668 use variable pitch pulley belt drives connected to the input shaft or the input and output shafts of an epicyclic speed reducer for providing an infinitely variable transmission.

Ordinary and epicyclic gearing also can be connected in series to overcome a disadvantage of either system when used alone. In the Hart reduction pulley, an initial speed reduction is achieved by an open V-belt drive connecting the output pulley of a motor and the input pulley of an epicyclic speed reducer. The result is that the total velocity ratio can be altered through a limited range by changing the velocity ratio of the open V-belt drive without changing the velocity ratio of the epicyclic speed reducer.

The Hart reduction pulley falls into a further class of speed reducers that includes the devices of Helling Canadian Pat. No. 456,655 and the following United States patents:

Morini U.S. Pat. No. 3,115,794;
Philpott et al. U.S. Pat. No. 3,842,685; and
Lee U.S. Pat. No. 4,044,633.

Each of these devices uses some type of endless loop force-transmitting element, such as a belt or a chain, in conjunction with an epicyclic speed reducer. Also, in each of these devices input power is applied directly to the carrier member for the orbiting planet shaft of the epicyclic reducer. An advantage of using endless loop force-transmitting elements that is not recognized in any of these patents is that higher input speed can be accommodated by speed reducers using endless loop force-transmitting elements rather than meshing gears; and a disadvantage of each of these devices that is not recognized in any of the patents is the decreased maximum input speed permitted by driving a carrier member directly.

SUMMARY OF THE INVENTION

The principal object of the present invention is to provide a compact and light speed reducer having a high velocity ratio, such as at least 1,000:1, providing high power transmission efficiency, such as about 90 percent, and usable for an extended period at high input speed, such as at least 3,000 rpm.

It also is an object to provide such a speed reducer in a form adaptable to a variety of applications including use in various motor-speed reducer combinations, and in reverted or nonreverted, constant velocity ratio or variable velocity ratio, constant output torque or regulated maximum output torque, and instantaneous or gradual start-up applications.

The foregoing objects can be accomplished by providing a compound epicyclic speed reducer having suns and planets connected by endless loop force-transmitting elements, such as belts or chains, and an idler carrier member supporting an orbiting planet shaft carrying the planets.

The preferred embodiment is a reverted speed reducer having coaxial input and output shafts carrying respective input and output suns, a stationary reaction sun coaxial with the other suns, three planets, respectively, for the respective suns and carried by a common planet shaft, and the idler carrier member carrying the planet shaft for orbiting about the axis of the input and output shafts. The input shaft always rotates faster than the planet shaft, so that maximum permissible input speed is always determined with respect to the speed of rotation of the input shaft, rather than with respect to the speed of rotation of the planet shaft or the carrier member.

BRIEF DESCRIPTION OF THE DRAWINGS

FIGS. 3 and 4 are corresponding somewhat diagrammatic fragmentary vertical axial sections of modified forms of speed reducers in accordance with the present invention showing alternative mountings of an electric motor at the input sides of the reducers.

FIG. 5 is a somewhat diagrammatic fragmentary enlarged vertical axial section of another embodiment of speed reducer in accordance with the present invention having a modified planet carrier assembly.

DETAILED DESCRIPTION

Figure 2:
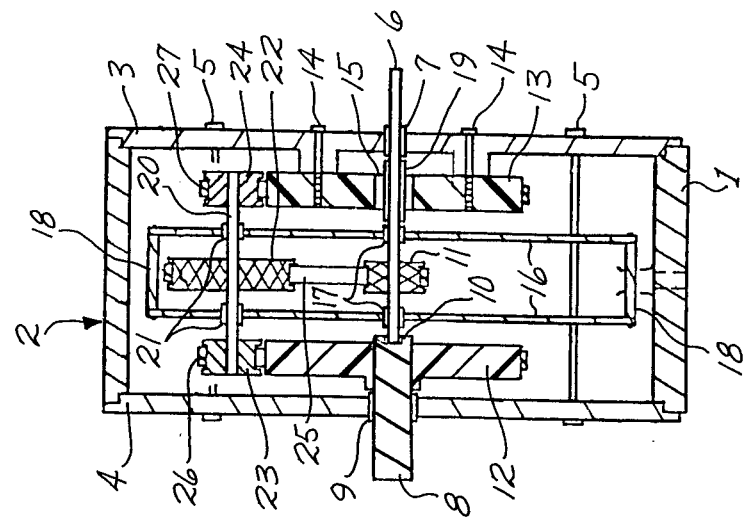
FIG. 2 is a somewhat diagrammatic vertical section taken along line 2—2 of FIG. 1.
Figure 1:
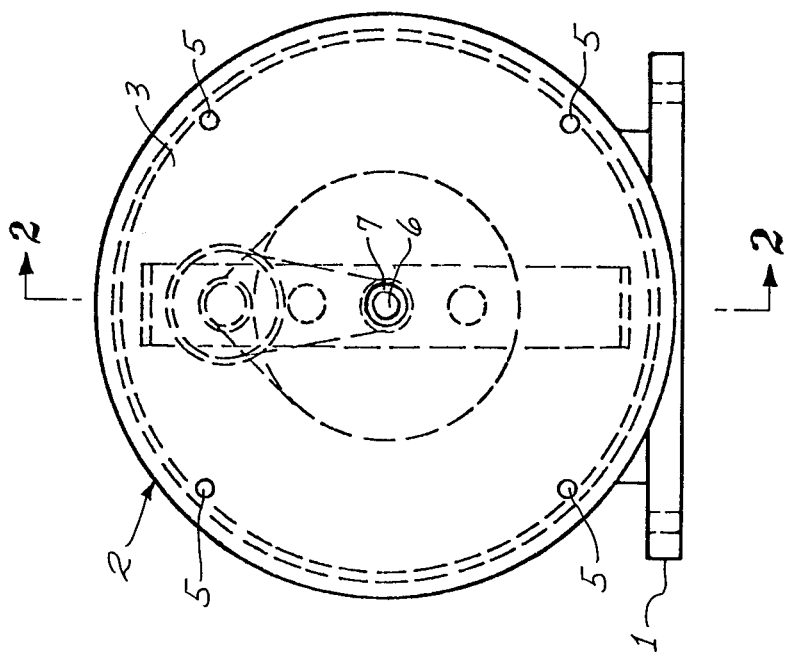
FIG. 1 is a somewhat diagrammatic end elevation of a compound epicyclic cog belt speed reducer in accordance with the present invention.

The compound epicyclic speed reducer in accordance with the present invention shown in FIGS. 1 and 2 includes a mounting base 1 supporting a closed, substantially cylindrical housing 2 having opposite end discs 3 and 4 joined by through-bolts 5. The bolts are spaced circumferentially of the end discs at generally their outer margins so as not to interfere with movement of the rotating internal parts of the reducer.

An input shaft 6 is journaled in a bearing 7 carried in an aperture through the center of the input end disc 3; and an output shaft 8 is journaled in a bearing 9 carried in an aperture through the center of the output end disc 4. Another bearing 10 carried in a blind axial bore in the inner end of the output shaft supports the inner end portion of the input shaft such that the two shafts are freely rotatable relative to each other about the same axis—the primary axis of the reducer.

Input shaft 6 carries an input sun 11 generally at the axial center of the reducer, and output shaft 8 carries an output sun 12 inside the housing adjacent to the output end disc 4. A reaction sun 13 is mounted stationarily in the housing 2 adjacent to the input end disc 3 by screws 14 and has an axial bore 15 through which the input shaft 6 passes freely. All of the suns are coaxial about the primary axis of the reducer.

Elongated parallel carrier plates 16, spaced apart axially of the reducer, have corresponding central portions located at opposite sides of the input sun 11 and project generally diametrally of the reducer to form an idler planet carrier assembly. The central portions of such carrier plates are journaled on input shaft 6 by bearings 17 so as to be freely rotatable relative to the input shaft. Corresponding swinging ends of the plates are joined by crossbars 18. A spacer tube 19 encircling to the input shaft generally inside the bore 15 through the reaction sun prohibits substantial movement of the idler carrier assembly axially of the input shaft.

A planet shaft 20 is journaled in corresponding end portions of the carrier plates 16 by bearings 21 and is freely rotatable relative to the carrier plates. Such shaft defines an axis—the secondary axis of the reducer—parallel to the primary axis and orbital about the primary axis by rotation of the carrier assembly. An input planet 22, an output planet 23 and a reaction planet 24 all are fixed to shaft 20 at axially spaced locations radially aligned, respectively, with input sun 11, output sun 12 and reaction sun 13. Each planet is connected to its associated sun by an endless loop force-transmitting element 25, 26 or 27.

Preferably, all of the suns and planets are cog wheels or sheaves and all of the endless loop force-transmitting elements are cog belts. Nevertheless, in an application requiring high torque transference or in an application where high temperature or stress would shorten the life of cog belts, the planets and suns can be sprockets and the endless loop force-transmitting elements can be chains.

In operation, rotation of input sun 11 by rotation of input shaft 6 necessarily effects rotation of input planet 22 by force transference by the input endless loop force-transmitting element 25. Since all of the planets are fixed to planet shaft 20 to rotate conjointly, reaction planet 24 is rotated by rotation of input planet 22 and, consequently, is driven orbitally around the stationary reaction sun 13 by force transference by the reaction endless loop force-transmitting element 27. Planet shaft 20, the other planets and the idler carrier assembly are swung around the primary axis of the reducer with the reaction planet. Rotation of output planet 23 about the secondary axis and orbiting of such planet about the primary axis effects rotation of output sun 12, and the output shaft 8 carrying such sun, by force transference by the output endless loop force-transmitting element 26, but at a much slower speed than the rotational speed of the input shaft.

The velocity ratio R of the speed reducer, that is, the rotative speed of input shaft 6 relative to the rotative speed of output shaft 8, depends on the relative sizes of the suns and planets and can be determined by the following equation in which it is assumed that all suns and planets are of the same pitch (same number of teeth per unit circumference) and in which "$N_i$" represents the number of teeth on a sun or planet "i" as designated in the above description:

$$R = \frac{1 - \frac{N_{13}N_{22}}{N_{24}N_{11}}}{1 - \frac{N_{13}N_{23}}{N_{24}N_{12}}}$$

For illustration, input sun 11, output planet 23 and reaction planet 24 all can have the same number of teeth "x", the relative numbers of teeth of the input sun 11 and the input planet 22 can be about 1:2, or x:2x, and the relative numbers of teeth of the input planet 22 and the reaction sun 13 can be about 1:2, or 2x:4x, as shown in the drawings, in which case the velocity ratio equation can be reduced to the following:

$$R = \frac{1 - \frac{(2x)(4x)}{(x)(x)}}{1 - \frac{(N_{13})(x)}{(x)(N_{12})}} = \frac{-7}{1 - \frac{N_{13}}{N_{12}}}$$

In this instance the velocity ratio R is totally dependent on the relative sizes of the output sun 12 and the reaction sun 13. If such suns are the same size, the velocity ratio is infinite, that is, the output shaft 8 will not rotate regardless of whether or not the input shaft is rotated; if the output sun is larger than the reaction sun, the velocity ratio is negative, that is, the output shaft will rotate in the opposite sense from the sense of rotation of the input shaft; and if the output sun is smaller than the reaction sun, the velocity ratio is positive, that is, the output shaft will rotate in the same sense as the sense of rotation of the input shaft.

To obtain a high velocity ratio, either positive or negative, the output sun should be only slightly larger or smaller than the reaction sun. Where cog wheels are used, the output sun can have only one more or one less tooth than the reaction sun. For example, in a representative installation the output sun can be a cog wheel having 150 teeth and the reaction sun can be a cog wheel having 151 teeth, in which case the velocity ratio is about 1,050:1.

The velocity ratio can be changed substantially by changing the size of one or more of the suns or planets slightly, particularly the output sun or the reaction sun. For example, adding one tooth to the reaction sun, so that the reaction sun has 152 teeth, cogs, without changing the size of the output sun, so that the output sun still has 150 teeth, results in a velocity ratio of about 525:1, that is, a 50 percent reduction in the velocity ratio. Such a slight change can be accomplished easily without altering the frame size or design by substituting one cog wheel for another. In contrast, in known systems using meshing sun and planet gears, the velocity ratio cannot be changed without providing one or more new or additional sets of precisely machined gears, which often necessitates a change in frame size or design.

The most important advantage of a speed reducer in accordance with the present invention is that such reducer can handle very high input speed for an extended period. Sets of wheels or sprockets connected by endless loop force-transmitting elements can be driven at a much higher speed than meshing gears of the same size, primarily because by use of flexible endless loop force-transmitting elements transmitted force is spread through several wheel or sprocket teeth, rather than being concentrated on one or two gear teeth as in meshing gears. In addition, spreading transmitted force through several teeth allows use of lighter wheel or sprocket materials having less strength than would be required for meshing gears transferring the same force.

To accommodate the fastest input speed possible, the input sun always should be effectively smaller than, or at least no larger than, the input planet so that the planet shaft rotates at a slower speed relative to the carrier assembly than the input shaft. Preferably the input planet is two to ten times larger than the input sun. In the embodiment of the invention shown in FIGS. 1 and 2, the reduction ratio $R_p$ from the input shaft 6 to the planet shaft 20, that is, the rotative speed of the input shaft relative to the rotative speed of the planet shaft, can be determined by the following equation:

$$R_p = \frac{1 - \frac{N_{13}N_{22}}{N_{24}N_{11}}}{1 - \frac{N_{13}}{N_{24}}}$$

and, as in the previous illustration, if input sun 11, output planet 23 and reaction planet 24 have "x" teeth, input planet 22 has 2x teeth, and reaction sun 13 has 4x teeth, the equation can be reduced as follows:

$$R_p = \frac{1 - \frac{(4x)(2x)}{(x)(x)}}{1 - \frac{(4x)}{(x)}} = \frac{-7}{-3} = 2.33:1.$$

Accordingly, the planet shaft would rotate at somewhat less than one-half the speed of rotation of the input shaft and in the same sense as the input shaft.

Similarly, it is preferred that the reaction planet be substantially smaller than the reaction sun, such as no greater than one-half the size of the reaction sun, so that the idler carrier assembly rotates even slower. The reduction ratio $R_c$ from the input shaft to the carrier assembly, that is, the rotative speed of the input shaft relative to the rotative speed of the carrier assembly, can be determined by the following equation:

$$R_c = 1 - \frac{N_{13}N_{22}}{N_{24}N_{11}}$$

which, assuming the same relative sizes of the suns and planets as before, reduces to $$R_c = -7:1.$$

Accordingly, the carrier assembly would rotate at one-seventh the speed of rotation of the input shaft, one-third the speed of the speed of rotation of the planet shaft, and in the opposite sense from the sense of rotation of the input shaft and planet shaft.

Using small planets also reduces the inertia of the carrier assembly so that less power is required to start the carrier assembly rotating.

In prior art devices in which a planet carrier assembly is rotated directly and, in effect, serves as the input component of the reducer, maximum input speed is limited because the planets and planet shaft carried by the carrier assembly rotate faster than, or at about the same speed as, the carrier assembly. Accordingly, in such prior art devices it is the maximum speed of rotation of the planet shaft or carrier member that determines the maximum input speed, whereas in the present invention maximum input speed is limited only by the maximum permissible speed of rotation of the input shaft. Considering that in the present invention the input shaft rotates several times faster than the planet shaft, it will be recognized that the speed reducer of the present invention can handle an input speed several times faster, such as 10,000 rpm or even faster, than prior epicyclic speed reducers having carrier members driven directly.

Specialized applications of the speed reducer of the present invention are shown in FIGS. 3 through 14. As shown in FIG. 3, the housing input end disc 3 can have an outward projecting mounting flange 28 on which the base 29 of a standard frame motor 30 can be stationarily mounted with the motor output shaft 31 in registration with the speed reducer input shaft 6. Such two shafts can be directly connected by a coupling 32.

Alternatively, as shown in FIG. 4, the housing input end disc 3 can have outward projecting mounting brackets 33 spaced on opposite sides of the input shaft 6 such that a flange frame motor 34 can be stationarily mounted on such brackets with its output shaft 35 in registration with the speed reducer input shaft 6 and connected to such input shaft by a coupling 36.

For very high speed or high torque applications, it is preferred that the carrier assembly be balanced, that is, have its center of gravity on the primary axis. In the duplex carrier assembly shown in FIG. 5, two sets of planets are carried, respectively, by two separate planet shafts 20 journaled in opposite end portions of the carrier plates 16 by bearings 17. Each set of planets includes an input planet 22, an output planet 23 and a reaction planet 24, each of the same size as the corresponding planet of the other set. The input shaft 6 carries two identical input suns 11 side-by-side between the carrier plates. Each input sun is radially aligned with one of the input planets and is connected thereto by an endless loop force-transmitting element 25. A single endless loop force-transmitting element 27 operably connects the two reaction planets 24 and the reaction sun 13. Similarly, a single endless loop force-transmitting element would connect the two output planets 23 and the output sun (not shown). In other respects, the embodiment of the present invention shown in FIG. 5 is identical to the embodiment shown in FIGS. 1 and 2. While two sets of planets are shown in FIG. 5, three or more sets could be provided, preferably spaced uniformly circumferentially around the primary axis of the reducer.

Figure 7:
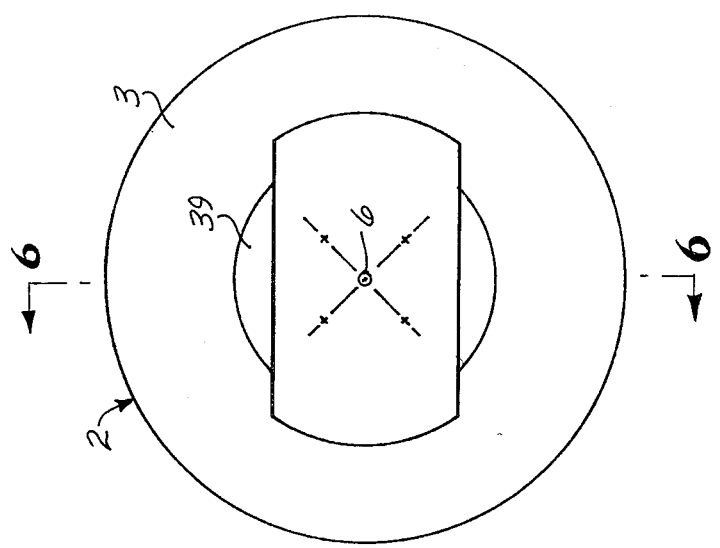
FIG. 7 is a somewhat diagrammatic end elevation of the speed reducer of FIG. 6.
Figure 6:
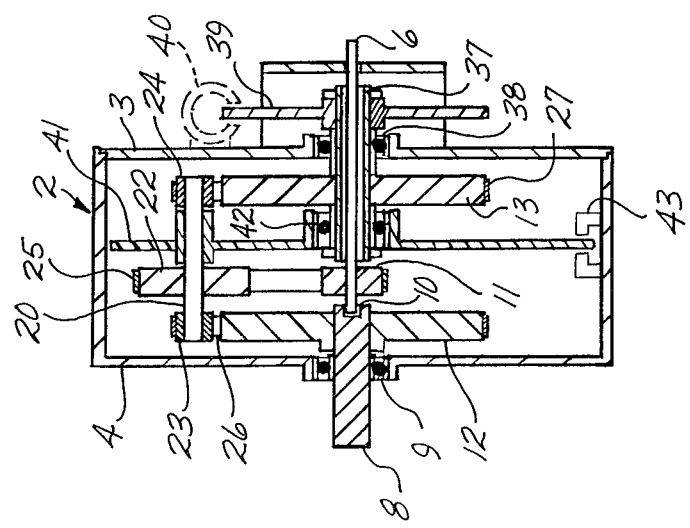
FIG. 6 is a somewhat diagrammatic vertical axial section of another embodiment of speed reducer in accordance with the present invention having maximum output torque control mechanism.

The embodiment of the present invention shown in FIGS. 6 and 7 also uses a substantially cylindrical housing 2 having opposite input and output end discs 3 and 4, respectively. Rather than being fixed to the input end disc, the reaction sun 13 is fixed on a sleeve 37 journaled in a bearing 38 carried in an aperture through the center of the input end disc. A brake disc 39 also is fixed to the sleeve, but outside of the housing, and a clamping brake mechanism 40 is provided to clamp or release the brake disc, thereby resisting rotation of the reaction sun or permitting it to rotate freely.

The input shaft 6 of such reducer extends through the bore of sleeve 37 and, as in the previous embodiments, has its inner end portion received in a bearing 10 carried in a blind axial bore in the inner end of output shaft 8 extending through the housing output end disc 4. The input sun 11 carried by the input shaft is connected to the input planet 22 carried by the planet shaft 20 by an endless loop force-transmitting element 25. Such planet shaft is supported for orbiting about the primary axis of the reducer by an idler carrier disc 41 journaled on sleeve 37 by a bearing 42 and freely rotatable relative to such sleeve. A suitable fastener, such as a nut, at the inner end portion of sleeve 37 prevents sliding of the carrier disc axially of such sleeve. The output planet 23 and the reaction planet 24 are carried at the opposite end portions of the planet shaft 20 in radial alignment with their corresponding output and reaction suns 12 and 13, respectively, and are connected to such suns by endless loop force-transmitting elements 26 and 27, respectively.

A further modification of the embodiment shown in FIGS. 6 and 7 is the provision of a clamping brake mechanism 43 for the idler carrier disc 41. Such brake is carried at the inner periphery of housing 2 and is actuatable to securely clamp the carrier disc, and thereby prevent its rotation, and is releasable for allowing free rotation of the carrier disc.

In use, with brake 40 actuated for preventing rotation of the brake disc 39 and the reaction sun 13, and with brake 3 released for permitting free rotation of the carrier disc, the embodiment of FIG. 7 operates the same as the embodiment of FIGS. 1 and 2. However, the speed reducer of FIG. 6 can be converted from epicyclic to ordinary operation by simultaneously releasing brake 40 for permitting free rotation of the reaction sun and applying brake 43 for preventing rotation of the carrier disc. In this instance, the primary and secondary axes of the reducer remain stationary relative to each other and the reducer acts as a two-stage ordinary speed reducer. The velocity ratio is the product of the ratios of the input and output sets, that is, the product of $N_{22}/N_{11}$ and $N_{12}/N_{23}$. This product will be several times less than the velocity ratio in epicyclic operation.

Brake 40 and brake disc 39 also can be used in cooperation to determine the maximum output torque transferable by output shaft 8. With brake 43 released, the frictional resistance applied by brake 40 to the brake disc can be selected at any desired value so that the reaction sun will slip if the applied torque exceeds a predetermined value. This would be beneficial, for example, if the load driven by the output shaft becomes jammed, preventing rotation of the output shaft, whereupon the brake disc would slip in its brake and permit rotation of the reaction sun before the reducer or the motor driving the input shaft is damaged.

Brake 40 and brake disc 39 also can be used in cooperation for gradual, as opposed to instantaneous, start-up. As discussed above, the present invention permits use of light, inexpensive high-speed electric motors for driving input shaft 6. It can take such a motor a substantial period to reach its designed operating speed, and if a substantial load is applied immediately, the motor could stall before the operating speed is reached. With brake 43 released for allowing free rotation of the carrier disc 41 and with brake 40 released enabling free rotation of brake disc 39 and reaction sun 24, even if a substantial load is applied to the output shaft, very little torque need be applied to the input shaft to start the carrier member revolving because the reaction sun is free to rotate. As the motor reaches its designed output speed, brake 40 can be applied gradually, whereupon the output shaft begins to turn, until finally the brake is fully applied resulting in the reaction sun being held stationary relative to the housing and the output shaft being rotated at maximum speed in epicyclic operation.

Figure 8:
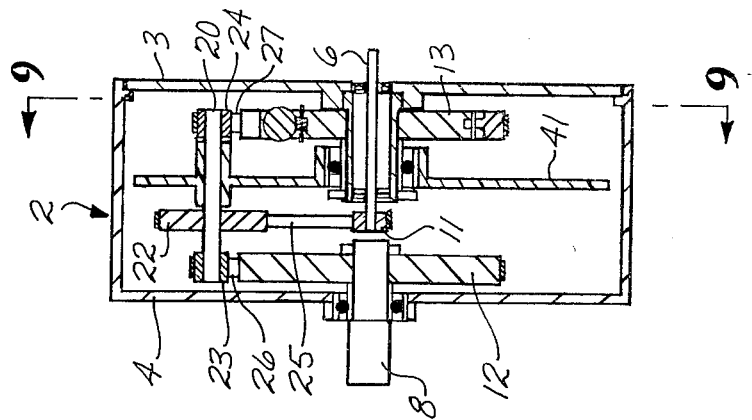
FIG. 8 is a somewhat diagrammatic vertical axial section of another embodiment of speed reducer in accordance with the present invention having a manually-controlled variable diameter reaction sun for changing the velocity ratio of the reducer.
Figure 9:
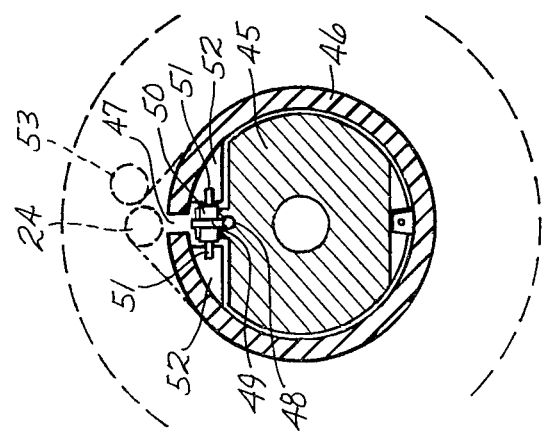
FIG. 9 is a somewhat diagrammatic fragmentary section taken along line 9—9 of FIG. 8.

The embodiment of the present invention shown in FIGS. 8 and 9 is very similar to the embodiment shown in FIGS. 6 and 7, the major differences being that the reaction sun 13 in FIGS. 8 and 9 is fixed to the housing input end disc 3 and is of variable effective circumferential extent for changing the velocity ratio of the reducer. As best seen in FIG. 9, the reaction sun 13 includes a central core portion 45 surrounded by a somewhat resilient annular outer strip 46. The adjacent ends of the annular strip do not abut, but rather define a narrow gap 47 at the top of the reaction sun. Such ends are movable toward and away from each other for reducing or increasing the effective circumferential extent of the reaction sun by manually turning a worm 48 meshing with a worm gear 49 formed integral with a sleeve nut 50. The sleeve nut, serving as a turnbuckle, receives oppositely threaded screws 51 projecting from plates 52 rigidly attached to the inner peripheries of the opposite end portions of the annular strip 46.

Rotation of worm gear 49 in one direction will reduce the effective size of the reaction sun while rotation of the worm gear in the opposite direction will increase the effective size of the sun. As previously discussed, even a slight change in the effective size of the reaction sun effects a substantially change in the velocity ratio of the reducer. As shown in FIG. 9, an idler pulley 53 can be provided to tension the reaction endless loop force-transmitting element 27 despite changes in the effective size of the reaction sun.

Figure 10:
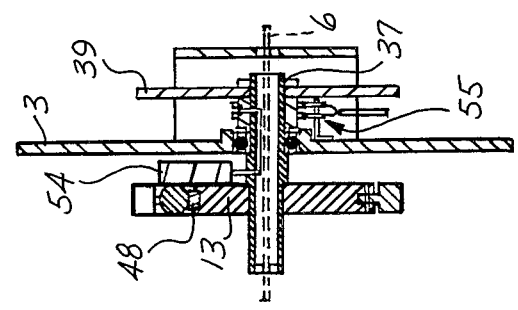
FIG. 10 is a somewhat diagrammatic fragmentary vertical axial section of another embodiment of speed reducer in accordance with the present invention having a power-controlled variable diameter reaction sun.

As shown in FIG. 10, the modifications of FIGS. 6 and 7 and FIGS. 8 and 9 can be combined. The embodiment of FIG. 10, like the embodiment of FIGS. 6 and 7, has a brake disc 39 and reaction sun 13 both fixed to a sleeve 37 rotatably mounted in the housing input end disc 3. The construction of the reaction sun of the embodiment of FIG. 10 is substantially identical to the construction of the reaction sun in FIGS. 8 and 9, with the exception that an electric motor 54 is provided for turning worm 48 to adjust the effective circumferential extent of the reaction sun. Power to the electric motor 54 is supplied through slip rings 55. Accordingly, the velocity ratio of the speed reducer can be adjusted from a remote location for speed control of the output shaft.

Figure 11:
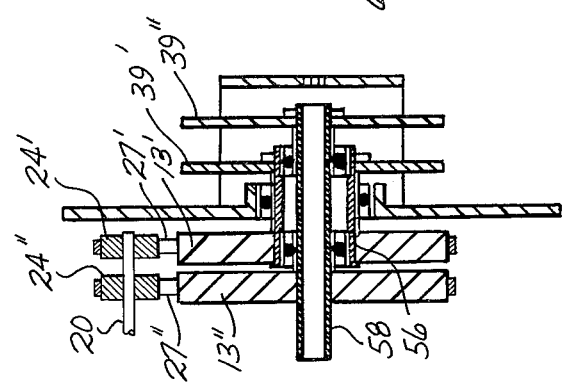
FIG. 11 is a somewhat diagrammatic fragmentary vertical axial section of another embodiment of speed reducer in accordance with the present invention having alternative reaction suns for variable speed control.

The embodiment of the present invention shown in FIG. 11 has two reaction suns 13' and 13" in side-by-side arrangement, each having its own associated brake disc 39' or 39". The diameters of the two reaction suns are slightly different. The reaction sun 13' adjacent to the housing input end disc 3 is fixed to a sleeve 56 carrying the clutch disc 39' and extending through the central aperture in such end disc. The other reaction sun 13" is fixed to a sleeve 58 extending through the bore of sleeve 56 and carrying the other brake disc 39". Both sleeves are freely rotatable relative to each other and relative to the housing input end disc.

The planet shaft 20 carried by the idler carrier assembly (not shown) has two reaction planets 24' and 24" connected to their corresponding reaction suns by endless loop force-transmitting elements 27' and 27". Separate brakes (not shown) are provided for the two brake discs. In all other respects, the embodiment of FIG. 11 is identical to the embodiment of FIGS. 6 and 7.

In operation, one or the other of the brake discs is fixed by actuation of its associated brake for maintaining the corresponding reaction sun stationary while the other brake disc and reaction sun are free to rotate. Accordingly, either of two velocity ratios can be selected depending on which brake disc and reaction sun are maintained stationary.

Figure 12:
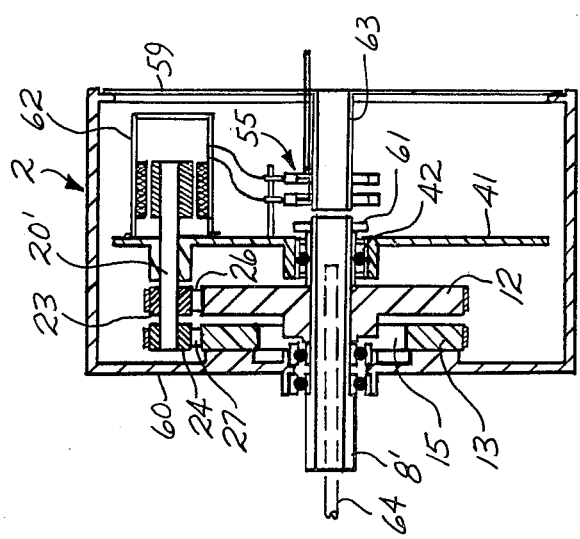
FIG. 12 is a somewhat diagrammatic vertical axial section of another embodiment of speed reducer in accordance with the present invention, illustrating a nonreverted form.

FIG. 12 illustrates a "nonreverted" embodiment of the present invention, that is, an embodiment in which the input and output members are not coaxial, using a substantially cylindrical housing 2 having opposite end discs 59 and 60. An output sleeve 8' is journaled in bearings 9' carried in an aperture through the center of end disc 60 and is freely rotatable relative to such end disc. Inside the housing, an output sun 12 is fixed to the output sleeve and a reaction sun 13 having a large central bore 15 receiving the sleeve is fixed to the housing end disc 60. The suns are coaxial about the axis of the output sleeve—the primary axis of the reducer. An idler carrier disc 41 is rotatably mounted on the inner end portion of the output sleeve by a bearing 42. Sliding of the carrier disc axially of the output sleeve is prevented by a fastener such as a nut 61.

A light, high-speed electric motor 62 is mounted at the outer margin of the idler carrier disc with its output shaft projecting parallel to but spaced from the axis of output sleeve 8'. The motor shaft serves as the planet shaft 20' for the output planet 23 and the reaction planet 24 aligned, respectively, with output sun 12 and reaction sun 13. Such planets are fixed to the output shaft for conjoint rotation and are connected to their respective suns by endless loop force-transmitting elements 26 and 27.

Power to the electric motor is supplied through slip rings 55 mounted on a stationary sleeve 63 projecting inward from housing end disc 59 and coaxial with the output sleeve 8'. The speed reducer of FIG. 12 can be conveniently mounted with a separate shaft 64 extending through the bores of sleeves 8' and 63, which shaft can be stationary or movable without interferring with operation of the reducer. Alternatively, output sleeve 8' can have internal threads complemental to external threads of shaft 64, and shaft 64 can be nonrotatable, such that rotation of the output sleeve moves shaft 64 axially through the reducer.

In operation, rotation of reaction planet 24 by rotation of the motor output shaft 20' effects rotation of the entire carrier assembly, including the motor, about the stationary reaction sun 13. Rotation of output planet 23 about the axis of the motor output shaft and orbiting of such planet about the primary axis of the reducer effects rotation of output sun 12 and output shaft 8' carrying such sun. The velocity ratio R of the speed reducer, that is, the rotative speed of the motor output shaft acting as the planet shaft 20' as compared to the rotative speed of output shaft 8' can be shown to be represented by the following equation:

$$R = \frac{1 - \frac{N_{13}}{N_{24}}}{1 - \frac{N_{13}N_{23}}{N_{24}N_{12}}}$$

If the two planets are the same size, each having "x" teeth, and the relative numbers of teeth of the reaction planet 24 and the reaction sun 13 is 1:8, or 1x:8x, the velocity ratio equation can be reduced to the following:

$$R = \frac{1 - \frac{8x}{x}}{1 - \frac{N_{13}x}{xN_{12}}} = \frac{-7}{1 - \frac{N_{13}}{N_{12}}}$$

This equation is the same as the reduced equation for the embodiment of FIGS. 1 and 2. Accordingly, if the output sun is a cog wheel having 150 teeth and the reaction sun is a cog wheel having 151 teeth, the velocity ratio is 1,050:1.

Figure 13:
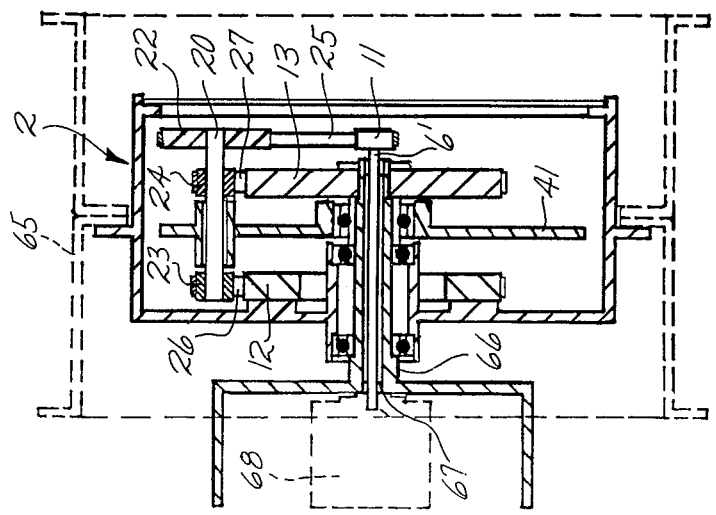
FIG. 13 is a somewhat diagrammatic vertical axial section of another embodiment of speed reducer in accordance with the present invention, illustrating an "electric wheel" application in which the speed reducer is built into the hub of a wheel and an electric motor is mounted outside the hub.

FIG. 13 illustrates an "electric wheel" application using an electric motor and a speed reducer in accordance with the present invention for driving each wheel of an electric vehicle such as an electric wheelchair or an electric automobile. The reducer is housed inside the substantially cylindrical central hub 2 of a vehicle wheel 65. Such hub is rotatably mounted on a nonrotatable axle 66 having an axial bore 67. The output shaft of a high-speed electric motor 68 mounted stationarily relative to the axle extends through the axle bore and serves as the input shaft 6' of the reducer. The inner end portion of such shaft carries the input sun 11. There is no output shaft, but rather the output sun 12 is fixed to a side of hub 2. The reaction sun 13 is fixed to the inner end portion of axle 66. All of the suns are coaxial.

A carrier disc 41 is journaled on the axle and is freely rotatable relative thereto. Such carrier disc carries a planet shaft 20 extending parallel to the primary axis of the reducer and having an input planet 22, an output planet 23 and a reaction planet 24 in radial alignment with their respective suns. The planets are connected to the suns by endless loop force-transmitting elements 25, 26 and 27. As in the previous embodiments, all of the planets rotate conjointly.

The operation of the embodiment of FIG. 13 is substantially the same as the operation of the embodiment of FIGS. 1 and 2. Rotation of the input sun 11 by rotation of the motor output shaft effects rotation of the wheel hub 2 and wheel 65 relative to the nonrotatable axle 66 carrying the reaction sun.

The velocity ratio of the embodiment of FIG. 13 can be changed by removing the output endless loop force-transmitting element 23, so that there is no force transference between the output planet and sun, and fixing carrier disc 41 to hub 2. In this instance, the wheel 65 rotates at the same speed as the speed of rotation of the carrier disc, which is faster than the speed of rotation of the output sun 12 with belt 23 connected and the carrier disc free to rotate relative to the hub. Speed shift mechanism, similar to the embodiment of FIGS. 6 and 7, can be incorporated to select between the two types of operation. Rather than being fixed to an end of the hub, output sun 12 can be rotatable relative to the hub, and a brake or lock provided to prevent or allow rotation of the output sun relative to the hub. A further brake or lock for the carrier disc would be required to prevent rotation of the carrier disc relative to the hub when the output sun is rotatable and to allow rotation of the carrier disc relative to the hub when the output sun is fixed.

Figure 14:
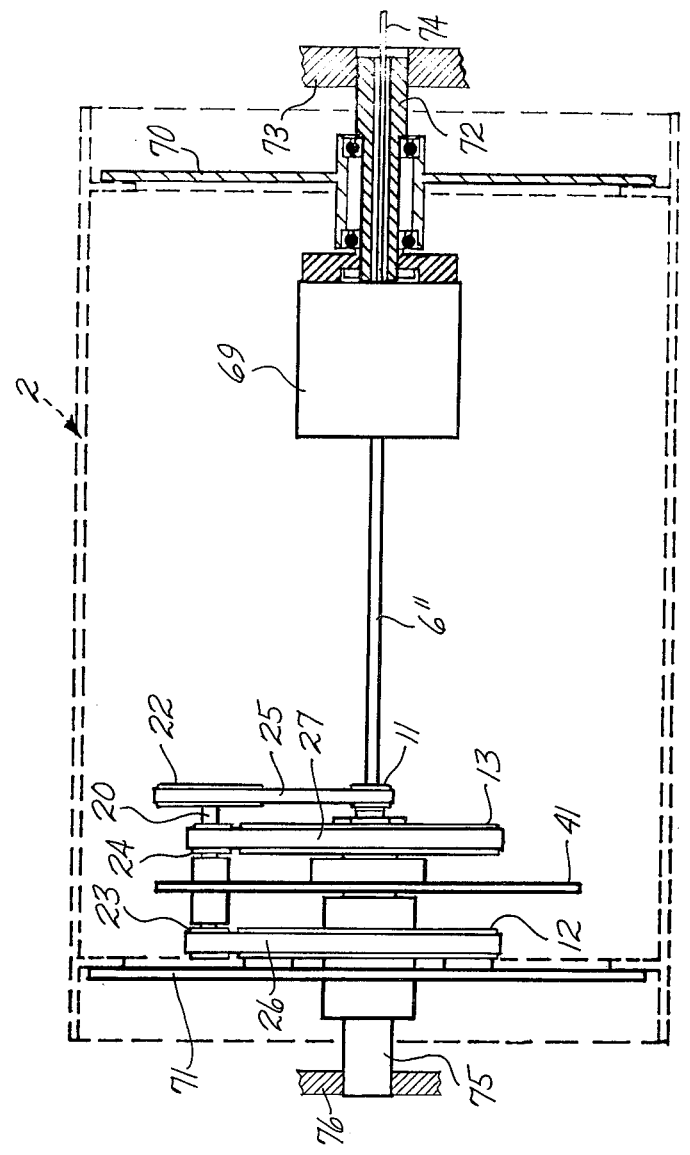
FIG. 14 is a somewhat diagrammatic vertical axial section of a speed reducer in accordance with the present invention, illustrating a "drum motor" application in which the speed reducer and an electric motor are mounted inside a drum for rotating the drum.

FIG. 14 illustrates a "drum motor" application using an electric motor and a speed reducer in accordance with the present invention in which the high-speed electric motor 69 is mounted inside a cylindrical drum 2, such as a roller drum or a drum driving a belt conveyor. Such drum has opposite end discs 70 and 71. Motor 69 is mounted inside the drum by a mounting sleeve 72 rotatably received in an aperture through the center of drum end disc 70. As diagrammatically illustrated at the right of FIG. 14, the motor mounting sleeve is rigidly attached to the frame 72 on which the drum motor is mounted for preventing rotation of the electric motor. The power connection 74 for the motor extends lengthwise through the axial bore of the stationary mounting sleeve 72.

The rotating motor output shaft extends axially of the drum 2 toward drum end disc 71 and serves as the input shaft 6" of the reducer. The free end portion of the input shaft is received in a bore in the inner end of a reaction shaft 75 rotatably mounted in a central aperture in end disc 71. The input sun 11 rotates with input shaft 6"; the output sun 12 is fixed to the inner side of end disc 70; and the reaction sun 13 is fixed to the inner end portion of reaction shaft 75.

An idler carrier disc 41 is rotatably mounted on sleeve 75 and supports a planet shaft 20 extending parallel to the primary axis of the reducer and carrying an input planet 22, an output planet 23 and a reaction planet 24 radially aligned with their respective suns. Corresponding suns and planets are connected by endless loop force-transmitting elements 25, 26 and 27.

As diagrammatically illustrated at the left of FIG. 14, a brake 76 carried by the stationary frame 73 supporting the drum motor normally is clamped for preventing rotation of reaction shaft 75 and reaction sun 13 relative to the frame. Rotation of the input sun 11 by rotation of shaft 6" effects rotation of all of the planets conjointly, and rotation of the reaction planet 24 effects rotation of the entire carrier assembly around the stationary reaction sun 13. Rotation and orbiting of the output planet 23 effects rotation of the output sun 12, and the drum to which it is attached, relative to the frame. The drum-driving engagement of the input sun 11 with the output sun 12 can be disconnected by releasing brake 76 for allowing rotation of the reaction sun relative to the frame.

In each embodiment of the invention, the suns and planets of the epicyclic speed reducer are connected by endless loop force-transmitting elements, and input power is transferred directly to a planet shaft supported by a idler carrier member, permitting high input speed and easy adjustment of the velocity ratio of the reducer by substitution of one planet or sun for another.

I claim:

1. A compound epicyclic speed reducer comprising:
 a frame;
 a reaction sun;
 means for maintaining said reaction sun stationary relative to said frame;
 an output sun coaxial with said reaction sun, the common axis of said two suns defining a primary axis;
 at least two planets, one for each of said suns, including a reaction planet and an output planet;
 planet shaft means for carrying said planets for conjoint rotation;
 an idler carrier assembly rotatably supporting said planet shaft means spaced from and extending substantially parallel to said primary axis, the axis of said planet shaft means supported by said idler carrier assembly defining a secondary axis;
 at least two endless loop force-transmitting elements connecting, respectively, said reaction sun and said reaction planet, and said output sun and said output planet; and
 rotary input means for driving said planet shaft means and thereby effecting conjoint rotation of said two planets about said secondary axis, rotation of said reaction planet effecting rotation of said idler carrier member about said primary axis for orbiting of said planet shaft and said planets about said primary axis, and rotation of said output planet about said secondary axis in combination with orbiting of said output planet about said primary axis effecting rotation of said output sun.

2. The speed reducer defined in claim 1, in which the input means includes an input sun coaxial with the reaction sun and the output sun, an input planet carried by the planet shaft means for conjoint rotation with the reaction planet and the output planet, an additional endless loop force-transmitting element connecting said input sun and said input planet and means for rotating said input sun.

3. The speed reducer defined in claim 2, in which the effective circumferential extent of the input planet is substantially larger than the effective circumferential extent of the input sun such that rotation of the input sun at one speed effects rotation of the input planet at a substantially slower speed.

4. The speed reducer defined in claim 3, in which the effective circumferential extent of the input planet is at least twice the effective circumferential extent of the input sun.

5. The speed reducer defined in claim 1 or 3, in which the effective circumferential extent of the reaction sun is substantially larger than the effective circumferential extent of the reaction planet such that rotation of the reaction planet about the secondary axis at one speed effects orbiting of such planet about the primary axis at a substantially slower speed.

6. The speed reducer defined in claim 5, in which the effective circumferential extent of the reaction sun is at least twice the effective circumferential extent of the reaction planet.

7. The speed reducer defined in claim 1, in which the rotary input means includes an electric motor having an output shaft rotating at a speed of at least 3,000 rpm.

8. The speed reducer defined in claim 1 or 7, in which the velocity ratio of the speed reducer is at least 1,000:1.

9. The speed reducer defined in claim 1, including a plurality of sets of planets, each set of planets including a reaction planet and an output planet, and a plurality of planet shaft means each carrying one set of planets for conjoint rotation, and in which the idler carrier assembly rotatably supports the plurality of planet shaft means spaced substantially uniformly circumferentially around the primary axis, the endless loop force-transmitting elements connecting, respectively, the reaction sun and all of the reaction planets and the output sun and all of the output planets, and the rotary input means including means for driving all of said planet shaft means.

10. The speed reducer defined in claim 1, in which the reaction sun is fixed to the frame.

11. The speed reducer defined in claim 1, in which the reaction sun maintaining means includes brake means actuatable for maintaining the reaction sun stationary relative to the frame and releasable for allowing rotation of the reaction sun relative to the frame.

12. The speed reducer defined in claim 11, in which the brake means includes a brake disc connected to the reaction sun and rotatable therewith and a clamping brake mechanism actuatable for resisting rotation of said brake disc relative to the frame and releasable for allowing rotation of said brake disc relative to the frame.

13. The speed reducer defined in claim 11, including carrier brake means actuatable for preventing rotation of the idler carrier assembly about the primary axis and releasable for allowing free rotation of the idler carrier assembly about such axis.

14. The speed reducer defined in claim 13, in which the idler carrier assembly includes a carrier disc concentric about the primary axis, and the carrier brake means includes a clamping brake mechanism actuatable for resisting rotation of said carrier disc relative to the frame and releasable for allowing free rotation of said carrier disc relative to the frame.

15. The speed reducer defined in claim 1, in which the reaction sun is of variable effective circumferential extent for varying the velocity ratio of the speed reducer.

16. The speed reducer defined in claim 15, in which the reaction sun includes a somewhat resilient annular outer strip forming the outer periphery of the reaction sun, and including means for expanding and contracting said annular outer strip to vary the effective circumferential extent of said reaction sun.

17. The speed reducer defined in claim 16, in which the expanding and contracting means includes a remotely actuatable electric motor.

18. The speed reducer defined in claim 17, in which the electric motor is mounted on the reaction sun.

19. The speed reducer defined in claim 1 or 15, including means for tensionsing the endless loop force-transmitting element connecting the reaction sun and the reaction planet.

20. The speed reducer defined in claim 1, including a second reaction sun coaxial with the output sun, a second reaction planet carried by the planet shaft means for conjoint rotation with the other planets, an additional loop force-transmitting element connecting said second reaction sun and said second reaction planet and separate brake means, one for each of the reaction suns, each brake means being actuatable to resist rotation of its associated reaction sun relative to the frame and being releasable for allowing rotation of its reaction sun relative to the frame, said separate brake means being independently actuatable and releasable.

21. The speed reducer defined in claim 20, in which each brake means includes a brake disc connected to one of the reaction suns and rotatable therewith and a clamping brake mechanism actuatable for resisting rotation of its brake disc relative to the frame and releasable for allowing free rotation of its brake disc relative to the frame.

22. The speed reducer defined in claim 1, in which the rotary input means includes an electric motor having a rotary output member connected directly to the planet shaft means.

23. The speed reducer defined in claim 22, in which the electric motor is supported by the idler carrier assembly for rotation therewith.

24. The speed reducer defined in claim 23, including slip ring means mounted on the frame for supplying power to the electric motor.

25. The speed reducer defined in claim 1 or 21, including an output sleeve carrying the reaction sun and having an axial bore coaxial with the primary axis.

26. The speed reducer defined in claim 1, including a wheel hub rotatably supported by the frame for rotation about the primary axis, the output sun being fixed to such hub, and the rotary input means including an electric motor stationary relative to the frame and mounted outside of the wheel hub, rotation of the planet shaft means by said electric motor effecting rotation of said wheel hub relative to the frame.

27. The speed reducer defined in claim 1, including a substantially cylindrical drum supported by the frame for rotation about the primary axis, the rotary input means including an electric motor mounted inside the drum stationary relative to the frame and having a rotary output member extending substantially along the primary axis, the suns, planets and carrier assembly being carried inside the drum, and the output sun being fixed to the drum, rotation of the planet shaft means by rotation of the motor output member effecting rotation of the drum relative to the frame.

28. A compound epicyclic speed reducer comprising:
a frame;
at least two suns;
means mounting said suns on said frame in coaxial relationship, the common axis of said two suns defining a primary axis;
means for maintaining one of said suns stationary relative to said frame;
at least two planets, one for each of said suns;
planet shaft means for carrying said planets for conjoint rotation;
an idler carrier assembly rotatably supporting said planet shaft means spaced from and extending substantially parallel to said primary axis, the axis of said planet shaft means supported by said idler carrier assembly defining a secondary axis;
at least two endless loop force-transmitting elements connecting, respectively, one of said suns and one of said planets, and the other of said suns and the other of said planets;
rotary input means for effecting rotation of said planet shaft means and thereby effecting conjoint rotation of said two planets about said secondary axis, rotation of said planets effecting rotation of said idler carrier member about said primary axis for orbiting of said planet shaft and said planets about said primary axis; and
a rotary output member rotatably mounted on said frame and driven by rotation of said planets about said secondary axis in combination with orbiting of said planets about said primary axis.

29. Rotary drive mechanism comprising a high-speed electric motor having a rotary output member rotating at a high speed of at least 3,000 rpm, and a compound epicyclic speed reducer having a velocity ratio of at least 1,000:1 and including: an input shaft rotatable about a first axis by rotation of said motor rotary output member; an output shaft coaxial with the input shaft and rotatable relative thereto, three suns, all concentric about said first axis, including a stationary reaction sun, an input sun rotatable with said input shaft and an output sun rotatable with said output shaft; three planets, including a reaction planet for said reaction sun, an input planet for said input sun and an output planet for said output sun; planet shaft means carrying said three planets for conjoint rotation; an idler carrier member mounting said planet shaft means spaced from and extending substantially parallel to said first axis for orbiting of said planet shaft means about the primary axis; and three endless loop force-transmitting elements for connecting, respectively, said reaction sun and said reaction planet, said input sun and said input planet, and said output sun and said output planet.

* * * * *